USO10158525B2

(12) United States Patent
Shor et al.

(10) Patent No.: US 10,158,525 B2
(45) Date of Patent: Dec. 18, 2018

(54) SYSTEM AND METHOD FOR RADIO BASE STATION DEVICE HOT SWITCHING AND HOT SWAPPING

(71) Applicant: FREESCALE SEMICONDUCTOR, INC., Austin, TX (US)

(72) Inventors: Roi Menahem Shor, Tel-Aviv (IL); Avraham Horn, Givath Shmuel (IL); Shay Shpritz, Hod Ha Sharon (IL)

(73) Assignee: NXP USA, Inc., Austin, TX (US)

( * ) Notice: Subject to any disclaimer, the term of this patent is extended or adjusted under 35 U.S.C. 154(b) by 580 days.

(21) Appl. No.: 14/824,684

(22) Filed: Aug. 12, 2015

(65) Prior Publication Data
US 2017/0048910 A1    Feb. 16, 2017

(51) Int. Cl.
| H04L 12/24 | (2006.01) |
| H04W 24/04 | (2009.01) |
| H04W 88/08 | (2009.01) |

(52) U.S. Cl.
CPC ......... H04L 41/0803 (2013.01); H04W 24/04 (2013.01); H04W 88/08 (2013.01)

(58) Field of Classification Search
CPC .... H04W 88/085; H04W 24/02; H04L 29/06; H04L 69/04; H04L 69/08; H04L 69/22; H04L 25/03; H04L 27/2607; H04L 27/2615; H04L 27/2628; H04L 27/2647; H04L 27/265; H04L 43/18
USPC ........................................................ 370/254
See application file for complete search history.

(56) References Cited

U.S. PATENT DOCUMENTS

| 6,212,169 B1 | 4/2001 | Bawa et al. |
| 7,099,969 B2 | 8/2006 | McAfee et al. |
| 7,391,317 B2 | 6/2008 | Abraham et al. |
| 7,924,054 B1 * | 4/2011 | Doubler ................. H03M 9/00 326/41 |
| 7,940,667 B1 | 5/2011 | Coady et al. |
| 8,171,121 B2 | 5/2012 | Ayyar et al. |
| 8,295,294 B2 | 10/2012 | Kerr et al. |

(Continued)

FOREIGN PATENT DOCUMENTS

| CN | 101082894 A | 12/2007 |
| EP | 2772109 A1 | 9/2014 |
| WO | 2017077361 A1 | 5/2017 |

OTHER PUBLICATIONS

U.S. Appl. No. 14/987,072, Inventor Roi Menahem Shor, "System and Method for Automatic Delay Compensation in a Radio Base System", filed Jan. 4, 2016, Office Action—Non-Final Rejection, dated Sep. 14, 2017.

(Continued)

Primary Examiner — Natasha W Cosme

(57) ABSTRACT

A method performed by a radio base station, the method including determining a link configuration of a first communication link, the first communication link being a current communication link between a first radio equipment control (REC) device and a radio equipment (RE) device. The method further including in response to determining that a second communication link between a second REC device and the RE device is to replace the current communication link, instead of the first communication link, establishing, by the second REC device, the second communication link based on the determined link configuration of the first communication link.

18 Claims, 6 Drawing Sheets

(56) References Cited

U.S. PATENT DOCUMENTS

| | | | |
|---|---|---|---|
| 8,443,126 B2 | 5/2013 | Elboim | |
| 8,599,827 B2 | 12/2013 | Irvine | |
| 8,660,013 B2 | 2/2014 | Yonge, III et al. | |
| 8,676,273 B1 | 3/2014 | Fujisaki | |
| 8,908,650 B2 | 12/2014 | Aarflot et al. | |
| 9,036,544 B2 | 5/2015 | Johansson et al. | |
| 2004/0218565 A1 | 11/2004 | Davis | |
| 2005/0105534 A1 | 5/2005 | Osterling | |
| 2005/0259616 A1 | 11/2005 | Major et al. | |
| 2008/0171569 A1 | 7/2008 | Pralle et al. | |
| 2008/0225816 A1 | 9/2008 | Osterling et al. | |
| 2009/0245228 A1* | 10/2009 | Osterling | H04J 3/0638 370/350 |
| 2010/0291955 A1 | 11/2010 | Sattele | |
| 2012/0057572 A1 | 3/2012 | Evans et al. | |
| 2012/0250520 A1 | 10/2012 | Chen et al. | |
| 2014/0289781 A1 | 9/2014 | Frydman et al. | |
| 2014/0349640 A1* | 11/2014 | Fujita | H04M 1/24 455/425 |
| 2016/0037580 A1 | 2/2016 | Shor et al. | |
| 2017/0064661 A1 | 3/2017 | Katagiri et al. | |
| 2017/0070440 A1 | 3/2017 | Hardt et al. | |

OTHER PUBLICATIONS

Notice of Allowance dated Mar. 27, 2018 for U.S. Appl. No. 14/969,581, 20 pages.

Ericsson AB, et al., "CPRI Specification V6.1: Common Public Radio Interface (CPRI) Interface Specification," Section 2 (System Description, pp. 5-10) and Section 4.5 (Start-Up Sequence, pp. 62-70); Jul. 1, 2014; 129 pages.

U.S. Appl. No. 14/824,768, filed Aug. 12, 2015, entitled "System and Method for Radio Base Station Device Hot Reconnection (Hot Plugging)".

Non-Final Office Action dated Mar. 8, 2018 for U.S. Appl. No. 14/824,768, 16 pages.

Non-Final Office Action dated Feb. 22, 2018 for U.S. Appl. No. 14/969,879, 23 pages.

Notice of Allowance dated Sep. 6, 2017 for U.S. Appl. No. 14/969,581.

Final Office Action dated Jan. 19, 2018 for U.S. Appl. No. 14/987,072, 27 pages.

Notice of Allowance dated Jun. 20, 2018 for U.S. Appl. No. 14/987,072, 10 pages.

U.S. Appl. No. 14/969,581, Inventor Roi Menahem Shor, "System and Method for Automatic Load Adaptive Antenna Carrier Bandwidth Dynamic Reconfiguration in Radio Base Station System", filed Dec. 15, 2015, Office Action—Notice of Allowance, dated Dec. 21, 2017.

Notice of Allowance dated Apr. 16, 2018 for U.S. Appl. No. 14/987,072, 9 pages.

Notice of Allowance dated Jul. 18, 2018, U.S. Appl. No. 14/969,879, 20 pages.

* cited by examiner

SYSTEM AND METHOD FOR RADIO BASE STATION DEVICE HOT SWITCHING AND HOT SWAPPING

CROSS-REFERENCE TO RELATED APPLICATION(S)

The present application is related to co-pending U.S. patent application Ser. No. 14/824,768, entitled "SYSTEM AND METHOD FOR RADIO BASE STATION DEVICE HOT RECONNECTION (HOT PLUGGING)" filed on Aug. 12, 2015.

FIELD OF THE DISCLOSURE

This disclosure generally relates to a radio base station system, and more particularly to a system and method for radio base station device hot switching and hot swapping.

BACKGROUND

Radio base station systems (RBSs) operate to communicate between one or more radio access networks of a cellular communication system and one or more wireless user equipment units. An RBS has one or more radio equipment control REC) devices, one or more radio equipment (RE) devices having one or more antennas, and one or more point to point interface links connected between the REC devices and the RE devices. The REC devices operate to communicate with the radio access networks via a network interface and the RE devices operate to communicate with the wireless user equipment units via an air interface which transmits and receives signals over the one or more antennas. The REC and RE devices operate to communicate with each other via the one or more interface links, where the communication may utilize a streaming protocol that cannot be put on hold and, as such the interface links need to be operational for all communication.

A typical RBS has a primary REC connected to a RE via a primary link having characteristics that are determined during a negotiation process. In the event that the primary link between the primary REC and the RE fails, or in the event that the primary link is physically disconnected from the primary REC and the RE, the normal operation of the RBS fails. Such impacts the quality of service of the RBS.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

An embodiment of a radio base station system (RBS) is disclosed that includes a primary radio equipment control device (REC), a back-up REC, a radio equipment device (RE), a primary link connected to primary REC and RE, and a back-up link connected to the back-up REC and the RE. The RBS is brought into normal operation by determining an operating characteristic of a primary link of the primary REC, the RE, and the primary link. The determined operating characteristic are provided to the back-up REC so that the back-up REC can be maintained in a standby mode that allows rapid switching between the back-up REC and the primary REC in the event that a failure occurs.

Another embodiment of RBS operation is disclosed that includes a REC, a RE, and a link connected to the REC and the RE. During a configuration process, the state of the REC is determined that corresponds to a particular configuration of the communication link. The determined state of the REC is saved so that if during normal operation of the RBS the link becomes physically disconnected, normal communications can be quickly re-established using the saved REC state. Various embodiments of the present disclosure will be better understood with reference to the attached Figures.

Figure 1:
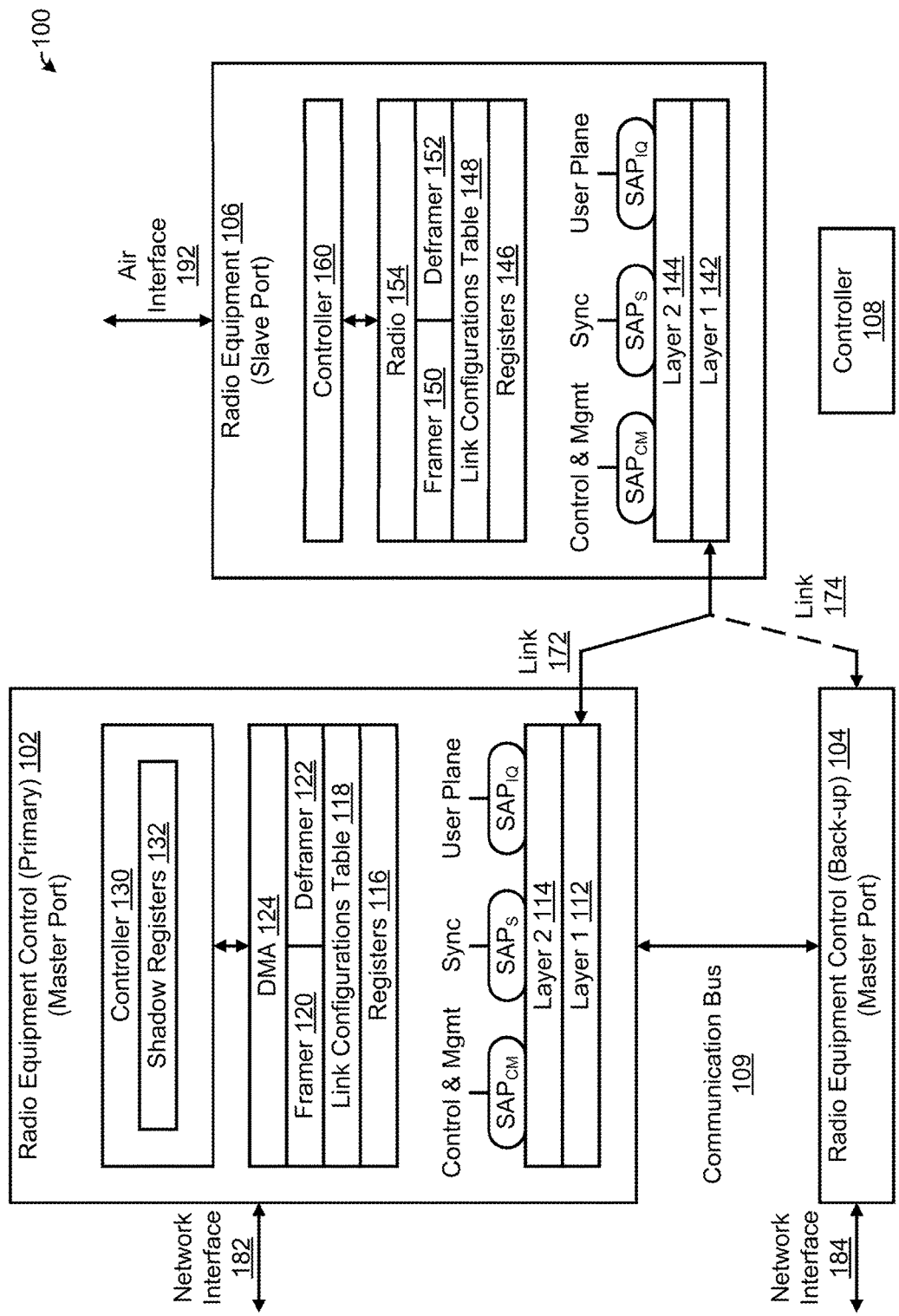
FIG. 1 is a block diagram illustrating a radio base station system including radio equipment control devices each having a controller that performs hot switching and hot swapping of devices of the radio base station system, in accordance with at least one embodiment of the present disclosure.

FIG. 1 illustrates a radio base station system (RBS) 100 that performs hot switching and hot swapping of the devices of RBS 100. RBS 100 includes a primary radio equipment control device (REC) 102, a back-up REC 104, and a radio equipment device (RE) 106. Primary and back-up RECs 102 and 104 communicate with one or more radio access networks of a cellular communications system (not illustrated) via radio access network interfaces 182 and 184, respectively. RE 106 communicates with one or more wireless user equipment units (not shown) via air interface 192 which transmits and receives signals over one or more antennas (not illustrated). An example of a wireless user equipment unit is a mobile station such as a mobile telephone, a wearable device such as a smart watch, a wireless robot, a laptop with mobile termination, an automobile telephone, a fixed wireless device, and the like, which can communicate voice, video, data, programs/program instructions, and the like with a radio access network. Primary and back-up RECs 102 and 104 communicate with each other via a communication bus 109 and with RE 106 via links 172 and 174, respectively. Links 172 and 174 are point to point interfaces that provide a digital connection between a REC and a RE and between a RE and another RE (not shown). Other RECs, REs, links, and devices (not shown) can be appropriately connected via the communication bus and the other links as needed or desired. Links 172 and 174 may be a Common Public Radio Interface (CPRI) link, an Open Base Station Architecture Initiative (OBSAI) interface link, and the like.

RBS 100 can support a plurality of radio access networks such as an Universal Mobile Telecommunications System (UMTS) network, an evolved UMTS Terrestrial Radio Access (E_UTRA) network, a Worldwide Interoperability for Microwave Access (WiMAX) network, a Global System for Mobile (GSM) network, a Code Division Multiple Access (CDMA) network, a wideband CDMA network, a Time Division Multiple Access (TDMA) network, a Long Term Evolution (LTE) network, a Long Term Evolution Advanced (LTE-A) network, and the like, as appropriate for the application.

Primary REC 102 includes a controller 130 having shadow registers 132, a layer 1 interface 112 connected to link 172, a layer 2 interface 114, registers 116, a link configurations table 118, a framer 120, a deframer 122, a direct memory access (DMA) 124, a service access point for control and management ($SAP_{CM}$), a service access point for synchronization ($SAP_S$), and a service access point for In-Phase and Quadrature (IQ) data ($SAP_{IQ}$). Link configurations table 118 includes link configurations information including all link configurations of link 172 that are supported by primary REC 102. $SAP_{CM}$ is mapped to an information flow of control plane data and management plane data, $SAP_S$ is mapped to an information flow of synchronization plane data, and $SAP_{IQ}$ is mapped to an information flow of user plane data based on IQ complex data. $SAP_{CM}$, $SAP_S$, and $SAP_{IQ}$ are defined on a per link basis. Controller 130, layer 1 interface 112, layer 2 interface 114, registers 116, link configurations table 118, framer 120, deframer 122, DMA 124, $SAP_{CM}$, $SAP_S$, and $SAP_{IQ}$, network interface 182, link 172, and link 174 can communicate with each other via an interconnect (not illustrated).

Primary REC 102 provides the radio functions of the digital baseband domain including the radio access network interface transport, transmit/receive between primary REC 102 and RE 106, the radio base station control and management, and the digital baseband processing. Back-up REC 104 is similar to primary REC 102 having similar components and providing similar functionality.

RE 106 includes a controller 160 that manages RE 106, a layer 1 interface 142 connected to links 172 and 174, a layer 2 interface 144, registers 146, a link configurations table 148, a framer 150, a deframer 152, a radio 154, a $SAP_{CM}$, a $SAP_S$, and a $SAP_{IQ}$. Link configurations table 148 includes link configurations information including all link configurations of link 172 and link 174 that are supported by RE 106. $SAP_{CM}$, $SAP_S$, and $SAP_{IQ}$ of RE 106 have similar structure and provide similar functionality as $SAP_{CM}$, $SAP_S$, and $SAP_{IQ}$ of primary REC 102 and are each associated with $SAP_{CM}$, $SAP_S$, and $SAP_{IQ}$ of primary REC 102, respectively. Controller 160, layer 1 interface 142, layer 2 interface 144, registers 146, link configurations table 148, framer 150, deframer 152, radio 154, $SAP_{CM}$, $SAP_S$, $SAP_{IQ}$, and air interface 192 communicate with each other via an interconnect (not illustrated).

RE 106 provides the analogue and radio frequency functions including filtering, modulation, frequency conversion, and amplification.

Primary REC 102, back-up REC 104, RE 106, controllers 130 and 160, layer 1 and layer 2 interfaces 112, 114, 142, and 144, framers 120 and 150, deframers 122 and 152, DMA 124, radio 154, and network interfaces 182 and 184 can be provided by, for example, a digital signal processor, an application specific integrated circuit device, a field programmable gate array, another type of logic circuit capable of performing operations, and the like. In an exemplary embodiment, primary REC 102 and back-up REC 104 represent digital baseband signal processors and RE 106 represents a digital signal processor.

Registers 116 includes all of the operating registers of primary REC 102 including the link 172 configuration and status registers. Controller 130 configures registers 116 during auto-negotiation and initializes registers 116 to enable communication between primary REC 102 and RE 106 and normal operation. Controller 130 further configures and monitors registers 116 to switch operation from primary REC 102 to back-up REC 104. Registers 116 includes transmit/receive antenna carrier control registers that indicates which antenna carriers are active, DMA transmit/receive control registers, transmit/receive sample width and number of antenna carriers registers, a mapping method register, and mapping information. In an embodiment, registers 116 may support a CPRI having CPRI transmit/receive antenna carrier control registers, CPRI DMA transmit/receive control registers, CPRI transmit/receive status registers, CPRI transmit/receive sample width and number of antenna carriers registers, a CPRI mapping method register that indicates that the mapping method is configured as basic or advanced, CPRI mapping information including a basic mapping mode and a mapping table for advanced mapping mode, and CPRI frame number registers.

Link configurations table 118 includes information about all of the link configurations of link 172 that are supported by primary REC 102. Controller 130 of primary REC 102 utilizes the information in link configurations table 118 to determine the link configuration of link 172 between primary REC 102 and RE 106 that both support during auto-negotiation. In particular, link configurations table 118 may include a link bit rate of the interface, a link protocol of the interface, a seed that is used for scrambling data, and the control and management link characteristics having a fast/slow control and management link bit rate of the interface. In an embodiment, scrambling the data is utilized when high link bit rates of the interface are used.

Layer 1 interface 112 is a physical layer interface that performs low level signaling and time division multiplexing of different data flows over link 172. Layer 1 interface 112 provides an electrical interface having electrical characteristics and an optical interface having optical characteristics.

Layer 2 interface 114 is a data link layer for providing flexibility and scalability and may provide different layer 2 protocols including a high data level link control (HDLC) slow control and management channel, an Ethernet fast control and management channel, and a vendor specific (VSS) control and management channel. Layer 2 interface 114 may further provide media access control, flow control, and data protection of the control and management information flow over link 172 via primary REC 102.

The control information flow involves control plane data of the control plane that is used for user plane control. The management information flow involves the management plane data of the management plane including carrier information that is used for the operation, administration, and maintenance of link 172 and RE 106. Layer 2 service access points (SAPs) are defined for the information planes or data flows and are denoted as $SAP_{CM}$, $SAP_S$, and $SAP_{IQ}$ of primary REC 102, as previously described.

Three different information flows including user plane data, control and management plane data, and synchronization plane data are multiplexed over link 172. The user plane data includes data to be transmitted/received between RBS 100 and the user equipment. In addition to the user plane data (IQ data), control and management (C&M) control signals as well as synchronization control signals are exchanged between primary REC 102 and RE 106. All information flows or "planes", including both control and user data, are multiplexed onto link 172 using layer 1 interface 112 and layer 2 interface 114 protocols. The different information flows have access to the layer 2 interface 114 via the appropriate service access points (SAPs) as described above.

Framer 120 multiplexes multiple data flows into particular frames associated with each data flow for transmission over link 172 to RE 106. Each data flow corresponds to data associated with one antenna for one carrier (not illustrated) and includes control and management information, synchronization information, and layer 1 interface 112 information. Similarly, information from RE 106 is received over link 172 and deframer 122 extracts and distributes to the appropriate SAP, the data flow, control and management, and layer 1 interface 112 timing and maintenance information.

DMA 124 allows the transfer of data between the devices of primary REC 102 in an efficient manner independently of controller 130. Examples of DMAs in processing devices are well known in the art, and will not be further elaborated on herein.

Registers 146 have similar structure as registers 116 and include all of the operating registers of RE 106 including the link 172 and link 174 configuration and status registers. Controller 160 configures registers 146 during the auto-negotiation between primary REC 102 and RE 106 and initializes registers 146 to enable communication between primary REC 102 and RE 106 and normal operation of RE 106. Similarly, controller 160 configures registers 146 during the auto-negotiation between back-up REC 104 and RE 106 and initializes registers 146 to enable communication between back-up REC 104 and RE 106 and normal operation.

Link configurations table 148 has similar structure as link configurations table 118 and includes information about all of the link configurations of links 172 and 174 that are supported by RE 106. Controller 160 utilizes the information in link configurations table 148 during the auto-negotiation between primary REC 102 and RE 106 to determine the link configuration of link 172 that both primary REC 102 and RE 106 support.

Layer 1 interface 142 is a physical layer interface that has similar structure and functionality as layer 1 interface 112 and performs the low level signaling and time division multiplexing of different data flows over link 172.

Layer 2 interface 144 is a data link layer that has similar structure and functionality as layer 2 interface 114 and provides RE 106 access to the different information flows via service access points $SAP_{CM}$, $SAP_S$, and $SAP_{IQ}$ of RE 106 which correspond to service access points $SAP_{CM}$, $SAP_S$, and $SAP_{IQ}$ of primary REC 102 and back-up REC 104.

Deframer 152 extracts control and management data and layer 1 interface 142 maintenance data received from primary REC 102 and provides it to controller 160. Deframer 152 extracts user plane data and forwards it to radio 154 for transmission to user equipment (not shown). Similarly, framer 150 multiplexes data flow information received from radio 154, control and management information, synchronization information, and layer 1 interface 112 information into particular frames for transmission over link 172 to primary REC 102.

RBS 100 operates to perform hot switching between devices. As such, RBS 100 includes controller 108 having logic and control mechanisms that are configured to perform various operations in the performance of the hot switching, as described below. Primary REC 102 performs a hard reset, which includes initializing link configurations table 118 with all the link configurations that are supported by primary REC 102. RE 106 also performs a hard reset, which includes initializing link configurations table 148 with all the link configurations that are supported by RE 106. In parallel to primary REC 102 performing its hard reset, back-up REC 104 also performs a hard reset, which includes initializing the link configurations table of back-up REC 104. In an embodiment, RBS 100 causes the hard resets of primary REC 102, RE 106, and back-up REC 104 by asserting hard reset signals of each of primary REC 102, RE 106, and back-up REC 104. In another embodiment, primary REC 102 may assert the hard reset signal of back-up REC 104. The link configurations that are supported by primary REC 102 and back-up REC 104 are the same link configurations. The link configurations that are supported by RE 106 may be the same as, a subset of, or different than the link configurations that are supported by primary REC 102 and back-up REC 104.

Controller 130 performs an auto-negotiation between primary REC 102 and RE 106, as described in detail below, to determine a link configuration of link 172 that is supported by both primary REC 102 and RE 106. In response to determining the link configuration of link 172, primary REC 102 stores (saves) the registers 116 at shadow registers 132. Primary REC 102 may also send the link configuration of link 172 to back-up REC 104. In another embodiment, primary REC 102 stores the link configuration of link 172 at a storage location (not shown) accessible by back-up REC 104, and signals back-up REC 104 that the link configuration of link 172 is available. Primary REC 102 then performs a basic initialization and enters normal operation utilizing link 172, where link 172 is the current link. The current link comprising the determined link configuration of link 172 and the auto-negotiation between primary REC 102 and RE 106.

In response to the hard reset being completed by back-up REC 104, back-up REC 104 determines the link configuration of link 172 that is supported by both primary REC 102 and RE 106 from primary REC 102. In an embodiment, back-up REC 104 receives the link configuration of link 172 from primary REC 102. In another embodiment, back-up REC 104 detects the signal from primary REC 102 that the link configuration of link 172 is available at the storage location (not shown) accessible/shared by both primary REC 102 and back-up REC 104 and, in response, reads the link configuration of link 172 from the shared storage location. In yet another embodiment, back-up REC 104 snoops all of the negotiation communication on link 172 between primary REC 102 and RE 106 to determine the link configuration of link 172. In response to determining the link configuration of link 172, back-up REC 104 stores the link configuration of link 172 at the shadow registers of back-up REC 104, and enters standby operation.

Primary REC 102, during normal operation, determines that a switch from primary REC 102 to back-up REC 104 is needed. Primary REC 102 may determine that the switch is needed based on receiving an indication of a malfunction of link 172 from link 172, a timer of primary REC 102 expires that indicates a communication between primary REC 102 and RE 106 has exceeded the time necessary to complete the communication and, as such, link 172 has malfunctioned, an indication of a malfunction of primary REC 102 and, as such, primary REC 102 is unavailable, an indication from RBS 100 that the switch is needed, for example, to allow maintenance of primary REC 102, and the like. Primary REC 102 assures that a control and management channel is idle. In an embodiment, the control and management channel may be a CPRI control and management channel.

Primary REC 102 resets link 172 control registers of registers 116 and registers 146 including the transmit/receive antenna carrier control registers and the transmit/receive control registers, where primary REC 102 performs the reset of link 172 control registers of registers 116 and transmits a reset to RE 106 to cause RE 106 to perform the reset of link 172 control registers of registers 146.

Primary REC 102 waits for link 172 transmit/receive status registers of registers 116 and registers 146 to indicate that link 172 control registers of registers 116 and registers 146 have been reset, where primary REC 102 may poll transmit/receive status registers of registers 116 until transmit/receive status registers of registers 116 indicate that link 172 control registers of registers 116 have been reset, for example, where transmit/receive status registers of registers 116 store a value of zero. Primary REC 102 may also receive an acknowledgement from RE 106 that indicates that the RE 106 link 172 control registers of registers 146 have been reset. When all link 172 control registers of registers 116 and registers 146 have been reset, all of the open advanced extensible interface (AXI) accesses are/have been closed.

Primary REC 102 disables framer 120 of primary REC 102 and proceeds to switch operation away from primary REC 102 to back-up REC 104. In an embodiment, primary REC 102 may send back-up REC 104 an indication that operation is being switched to back-up REC 104. In another embodiment, primary REC 102 stores the indication that operation is being switched to back-up REC 104 at a storage location (not shown) accessible by back-up REC 104 and signals back-up REC 104 that the indication that operation is being switched to back-up REC 104 is available. Thus, the operation has been switched away from primary REC 102 to back-up REC 104 and hot switching from primary REC 102 and link 172 to back-up REC 104 and link 174 of RBS 100 has completed on primary REC 102.

In response to back-up REC 104 receiving a signal that operation is being switched, back-up REC 104 performs an auto-negotiation between back-up REC 104 and RE 106 utilizing the link configuration of link 172 stored at the shadow registers of back-up REC 104, as described in detail below. In response to the auto-negotiation being completed, the registers of back-up REC 104 include the values of the link configuration of link 174 from the shadow registers, and back-up REC 104 and RE 106 are utilizing the same link configuration of link 174 that is supported by both back-up REC 104 and RE 106 and was previously determined by primary REC 102 and RE 106 during auto-negotiation described in detail above. Back-up REC 104 performs basic initialization of back-up REC 104 and enters normal operation. At this point, controller 130 of primary REC 102 and the controller of back-up REC 104 have completed the hot switching from primary REC 102, link 172, and RE 106 to back-up REC 104, link 174, and RE 106.

By preparing a (hot) back-up REC and having the back-up REC enter standby operation in parallel to preparing a primary REC and having the primary REC enter normal operation, as described above, the time to switch operation from the primary REC to the back-up REC is minimized. The time to switch operation to the back-up REC is further minimized by the back-up REC performing an auto-negotiation between the back-up REC and the RE utilizing the previously determined link configuration. In this manner, the overall time to perform hot switching from a primary REC to a back-up REC is minimized. As such, down time of the link is minimized and the service of the baseband provider is maximized.

In addition, when the link between the primary REC and the RE is the same physical link as the link between the back-up REC and the RE, the hardware needed to implement the radio base station system, described above, is minimized and results in lower system costs.

RBS 100 operates to perform hot swapping (back-to-back hot switching) of devices. Back-to-back hot switching means that RBS 100 first performs a hot switching of primary devices to back-up devices, and then performs the hot switching of the back-up devices back to the primary devices, as previously described. The RBS 100 may also first perform the hot switching of the back-up devices to the primary devices, and then perform the hot switching of the primary devices back to the back-up devices. Controller 108 is further configured to perform various operations in the performance of the hot swapping, as described below.

At the start of the hot swapping process, primary REC 102 is in a functional and/or ready state and enters standby operation and back-up REC 104 is in normal operation. As described above, a malfunction may have occurred during normal operation of primary REC 102 which necessitated a hot switch from primary REC 102 and link 172 to back-up REC 104 and link 174. In response to the malfunction and the hot switch, RBS 100 entered a fix operation to address the malfunction and cause primary REC 102 and link 172 to be returned to the functional state. As another example, RBS 100 performed the hot switch from primary REC 102 and link 172 to back-up REC 104 and link 174 to allow a software upgrade of primary REC 102. In response to the software upgrade of primary REC 102 being completed, RBS 100 caused primary REC 102 to be returned to the ready state.

In an embodiment, primary REC 102 may send back-up REC 104 an indication that primary REC 102 has entered standby operation. In another embodiment, primary REC 102 stores the indication that primary REC 102 has entered standby operation at a storage location (not shown) accessible by back-up REC 104 and signals back-up REC 104 that the indication that primary REC 102 has entered standby operation is available. In an embodiment, primary REC 102 may receive the link configuration of link 174 from back-up REC 104 and may store the link configuration at the shadow registers of back-up REC 104, where back-up REC 104 provides the link configuration of link 174 in response to determining that primary REC 102 had entered standby operation.

Back-up REC 104, during normal operation, determines that a switch from back-up REC 104 to primary REC 102 is needed. Back-up REC 104 may determine that the switch is needed based on receiving an indication that primary REC 102 has entered standby operation and, in response, back-up REC 104 provides the link configuration of link 174 to primary REC 102. Back-up REC 104 may also determine that the switch is needed in a manner similar to how primary REC 102 determined that a switch to back-up REC 104 was needed, as previously described.

Back-up REC 104 assures that a control and management channel is idle in a similar manner as described above with reference to primary REC 102.

Back-up REC 104 resets link 174 control registers of back-up REC 104 and RE 106, and waits for link 174 transmit/receive status registers of back-up REC 104 and registers 146 to indicate that the link 174 control registers of back-up REC 104 and RE 106 have been reset, similar to the manner previously described with reference to primary REC 102.

Back-up REC 104 then disables the framer of back-up REC 104, switches operation away from back-up REC 104 to primary REC 102, and signals/provides primary REC 102 an indication that operation is being switched to primary REC 102, as described above.

In response to primary REC 102 receiving a signal that operation has switched to primary REC 102, primary REC 102 performs the auto-negotiation between primary REC 102 and RE 106 utilizing the link configuration of link 172 stored at shadow registers 132, described in detail below. In response to primary REC 102 completing the auto-negotiation, primary REC 102 performs basic initialization of primary REC 102 and enters normal operation, completing the hot switching from back-up REC 104, link 174, and RE 106 to primary REC 102, link 172 and RE 106. At this point, the controller of back-up REC 104 and controller 130 have completed the hot swapping (back-to-back hot switching) from back-up REC 104, link 174, and RE 106 to primary REC 102, Link 172, and RE 106.

By addressing the malfunction of a primary REC and preparing the primary REC for normal operation while a back-up REC is in normal operation, this time is not part of the down time of the link. Performing hot switching back from the back-up REC to the primary REC with an auto-negotiation between the primary REC and the RE utilizing the previously determined link configuration minimizes the overall time to perform this switch. Thus, the overall time to perform the hot swapping is minimized, the link down time is minimized, and the quality of service of the baseband provider is improved.

In this manner, hot swapping and hot switching links allows rapid recovery with minimal down time and improved quality of service of the baseband provider.

The following describes the auto-negotiation process in further detail. Primary REC 102 performs the auto-negotiation between primary REC 102 and RE 106 to determine the link configuration of link 172 that is supported by both primary REC 102 and RE 106 in the following manner. Since link 172 may have been set up where the link configurations of primary REC 102 operate and the link configurations of RE 106 operate, are not initially known to each other, primary REC 102 and RE 106 must try different link configurations until a common link configuration is determined. Thus, primary REC 102 performs the auto-negotiation between primary REC 102 and RE 106 to determine the link configuration of link 172 that is supported by both primary REC 102 and RE 104. The following description is based on the CPRI nomenclature, but is not limited to just CPRI interfaces, but instead, may be employed in RBSs utilizing any interfaces between a REC and a RE.

The auto-negotiation process starts by determining the link bit rate of link 172 and reaching layer 1 synchronization between primary REC 102 and RE 106. Primary REC 102 starts to transmit over link 172 to RE 106 using, for example, the highest available link bit rate from the link configurations table of primary REC 102 and also attempts to receive over link 172 from RE 106 at the same link bit rate. If primary REC 102 does not reach layer 1 synchronization, (i.e., primary REC 102 does not receive the proper information and at the proper repetition rate), primary REC 102 selects, after an appropriate time delay, another available link bit rate from the link configurations table of primary REC 102, for example the next highest available link bit rate, and primary REC 102 starts to transmit/receive over link 172 to/from RE 106 using the other available link bit rate. This process proceeds until primary REC 102 reaches layer 1 synchronization with RE 106.

On the other side of link 172, RE 106 starts to receive over link 172 from primary REC 102 using, for example, the highest available link bit rate from the link configurations table of RE 106. If RE 106 does not reach layer 1 synchronization, (i.e., RE 106 does not receive the proper information and at the proper repetition rate), RE 106 selects, after a second appropriate time delay which may be different than the time delay utilized by primary REC 102, another available link bit rate from the link configurations table of RE 106, for example the next highest available link bit rate, and starts to receive over link 172 from primary REC 102 using the other available link bit rate. This process proceeds until RE 106 reaches layer 1 synchronization with primary REC 102. When RE 106 reaches synchronization of layer 1, RE 106 starts to transmit over link 172 to primary REC 102 at the same link bit rate that RE 106 successfully received at. At this point, synchronization of layer 1 of link 172 between primary REC 102 and RE 106 has been achieved with bi-directional communication.

In response to successfully determining the link bit rate that primary REC 102 and RE 106 support and achieving synchronization of layer 1 of link 172, the auto-negotiation process proceeds by determining the link protocol of link 172 that both primary REC 102 and RE 106 support. Similar to determining the link bit rate of link 172, primary REC 102 and RE 106 each propose, for example, the highest link protocol of its link configurations table. Primary REC 102 and RE 106 then compare the other's proposed highest link protocol with all the link protocols of its link configurations table to determine a match. If a match is not determined, primary REC 102 and RE 106 propose, for example, the next highest link protocol of its link configurations table and determine if there is a matching link protocol as described above. This auto-negotiation process proceeds until primary REC 102 and RE 106 determines the same link protocol that both support and the auto-negotiation proceeds using the same link protocol.

In response to successfully determining the same link protocol, the auto-negotiation process proceeds to determine a layer 2 fast control and management link bit rate of link 172 and a layer 2 slow control and management link bit rate of link 172 that both primary REC 102 and RE 106 support. The auto-negotiation process to determine the fast and the slow control and management link bit rate proceeds in parallel, with each fast/slow control management link bit rate determined similar to how the auto-negotiation process determined the link bit rate of link 172 as described above. As such, primary REC 102 and RE 106 determines the fast/slow control and management link bit rate of link 172 by successively trying an available fast/slow control and management link bit rate of each link configuration table of primary REC 102 and RE 106 until the same fast/slow control and management link bit rate of link 172 that both primary REC 102 and RE 106 support is determined.

In response to successfully determining the same fast/slow control and management link bit rate, the auto-negotiation process proceeds to determine a vendor-specific interface usage that both primary REC 102 and RE 106 support. The auto-negotiation to determine the same vendor-specific interface usage, for example vendor-specific interface capabilities and capability limitations, can be accomplished in a similar manner as described above for the other link configuration characteristics and results in the same (preferred) vendor-specific interface usage based on vendor-specific requirements. At this point, the auto-negotiation has completed and determined the link configuration of link 172 that is supported by both primary REC 102 and RE 106 and the link configuration registers 116 include the values of the link configuration of link 172.

Back-up REC 104 performs the auto-negotiation between primary REC 102 and RE 106 utilizing the link configuration of link 172 in the following manner. The link configuration of link 172, supported by both primary REC 102 and RE 106, was previously stored at shadow registers 132 of controller 130 of back-up REC 104. As back-up REC 104 and link 174 have the same characteristics of primary REC 102 and link 172, the link configuration storage at shadow registers 132 is already known to be supported by back-up REC 104, link 174, and RE 106. Thus, the auto-negotiation process is similar to the auto-negotiation process previously described but does not require the lengthy back and forth negotiations, involving trying various link parameters until common supported link parameters are found, between the back-up REC 104 and RE 106 to determine the link configuration that is supported by both.

The auto-negotiation process starts by controller 130 of back-up REC 104 utilizing the link bit rate of link 174 from the shadow registers 132 of controller 130 of back-up REC 104 to transmit/receive over link 174 to/from RE 106. As the link bit rate of link 174 is already known to be supported by both REC 104 and RE 106, back-up REC 104 quickly achieves synchronization of layer 1 of link 174 between back-up REC 104 and RE 106 with bi-directional communication.

In response to achieving synchronization of layer 1 of link 174, the auto-negotiation process proceeds by controller 130 of back-up REC 104 utilizing the link protocol of link 174 from the shadow registers 132 of controller 130 of back-up REC 104 to transmit/receive over link 174 to/from RE 106 the link protocol to achieve that both back-up REC 104 and RE 106 utilize the same/known link protocol of link 174.

In response to achieving utilization of the same link protocol of link 174, the auto-negotiation process proceeds by controller 130 of back-up REC 104 utilizing the determined fast/slow control and management rates of link 174 from the shadow registers 132 of controller 130 of back-up REC 104 to achieve that both back-up REC 104 and RE 106 utilize the same/known fast/slow control and management rates of link 174.

In response to achieving utilization of the same fast/slow control and management rates of link 174, the auto-negotiation process proceeds by controller 130 of back-up REC 104 utilizing the determined vendor-specific interface usage of link 174 from shadow registers 132 of controller 130 of back-up REC 104 to achieve that both back-up REC 104 and RE 106 utilize the same/known vendor-specific interface usage of link 174. At this point, the auto-negotiation has completed, the registers of back-up REC 104 include the values of the link configuration of link 174 from shadow registers 132 of controller 130 of back-up REC 104, and back-up REC 104 and RE 106 are utilizing the same link configuration of link 174 that is supported by both back-up REC 104 and RE 106 and was previously determined by primary REC 102 and RE 106 during auto-negotiation described in detail above.

Figure 2:
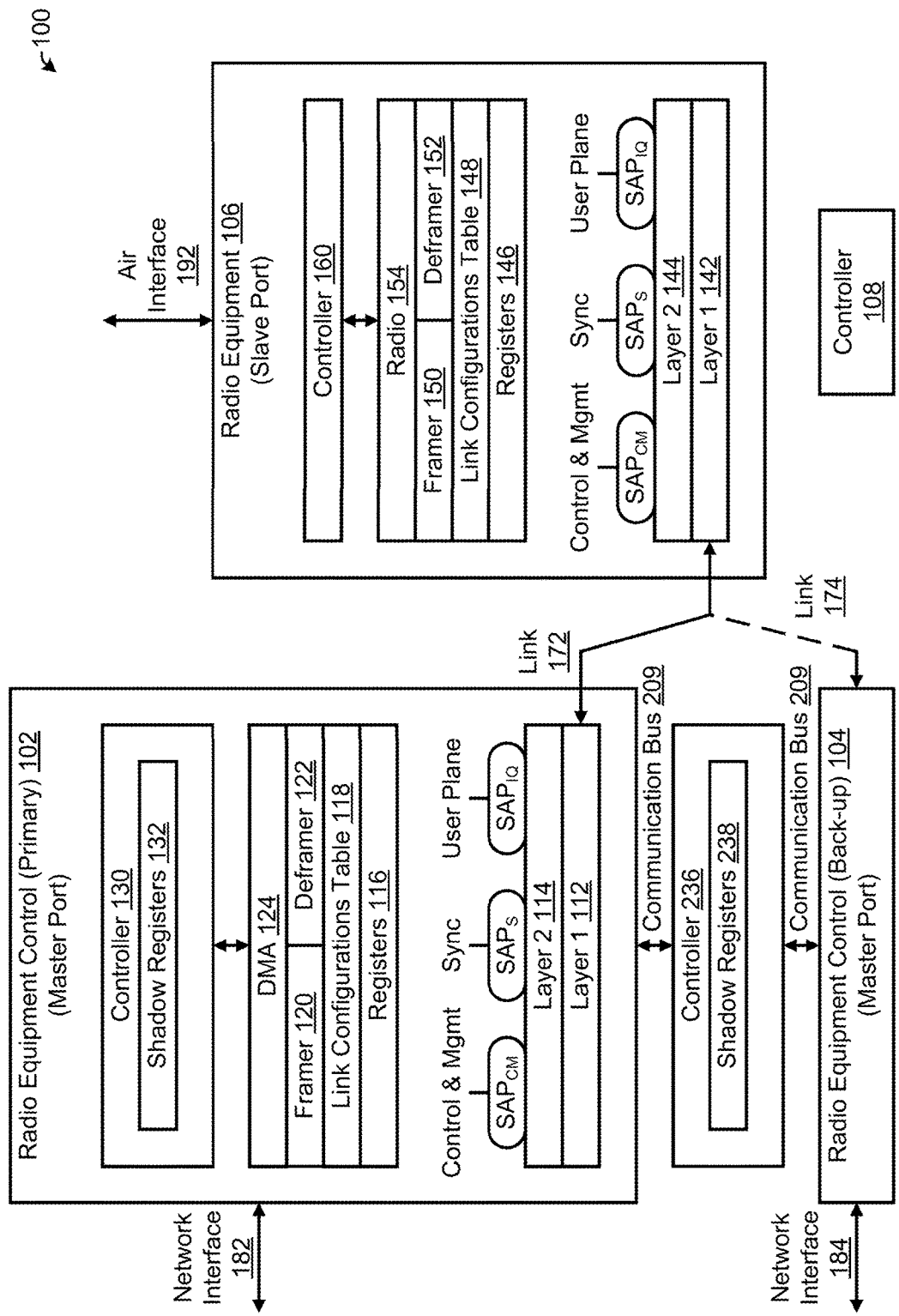
FIG. 2 is a block diagram illustrating a radio base station system including a controller that performs hot switching and hot swapping of devices of the radio base station system, in accordance with at least one embodiment of the present disclosure.

FIG. 2 illustrates another embodiment of RBS 100 that performs hot switching and hot swapping of devices, including a controller 236 having shadow registers 238 that has similar structure to shadow registers 132, primary REC 102, back-up REC 104, RE 106, links 172 and 174, network interfaces 182 and 184, and air interface 192. Primary REC 102, back-up REC 104, and controller 236 communicate with each other via communication bus 209. Primary REC 102 and back-up REC 204 communicate with RE 106 via links 172 and 174, respectively.

Controller 236 performs hot switching and hot swapping of devices of RBS 100 by transmitting a hard reset, auto-negotiate, and normal operation request to primary REC 102 and a hard reset and standby request to back-up REC 104 causing primary REC 102 to perform the hard reset, to perform the auto-negotiation between primary REC 102 and RE 106, to transmit the link configuration of link 172 to controller 236, to perform the initialization of primary REC 102, and to enter normal operation, and causing back-up REC 104 to perform the hard reset in parallel to the hard reset of primary REC 102, to determine the link configuration of link 172 between primary REC 102 and RE 106, and to enter standby operation, as described above with reference to FIG. 1. In response to receiving the link configuration of link 172, controller 236 stores the link configuration of link 172 at shadow registers 238.

Controller 236 further transmits a switch request to primary REC 102 and back-up REC 104 causing primary REC 102 to switch operation from the primary REC to back-up REC 104, and causing back-up REC 104 to perform an auto-negotiation of link 174 between back-up REC 104 and RE 106 utilizing the link configuration of link 172, to perform a basic initialization of back-up REC 104, and causing back-up REC 104 to enter normal operation, as described in further detail below. In an embodiment, link 172 and link 174 are the same link. Back-up REC 104 determines the link configuration by receiving the link configuration from controller 236, as previously described with reference to FIG. 1.

Figure 3:
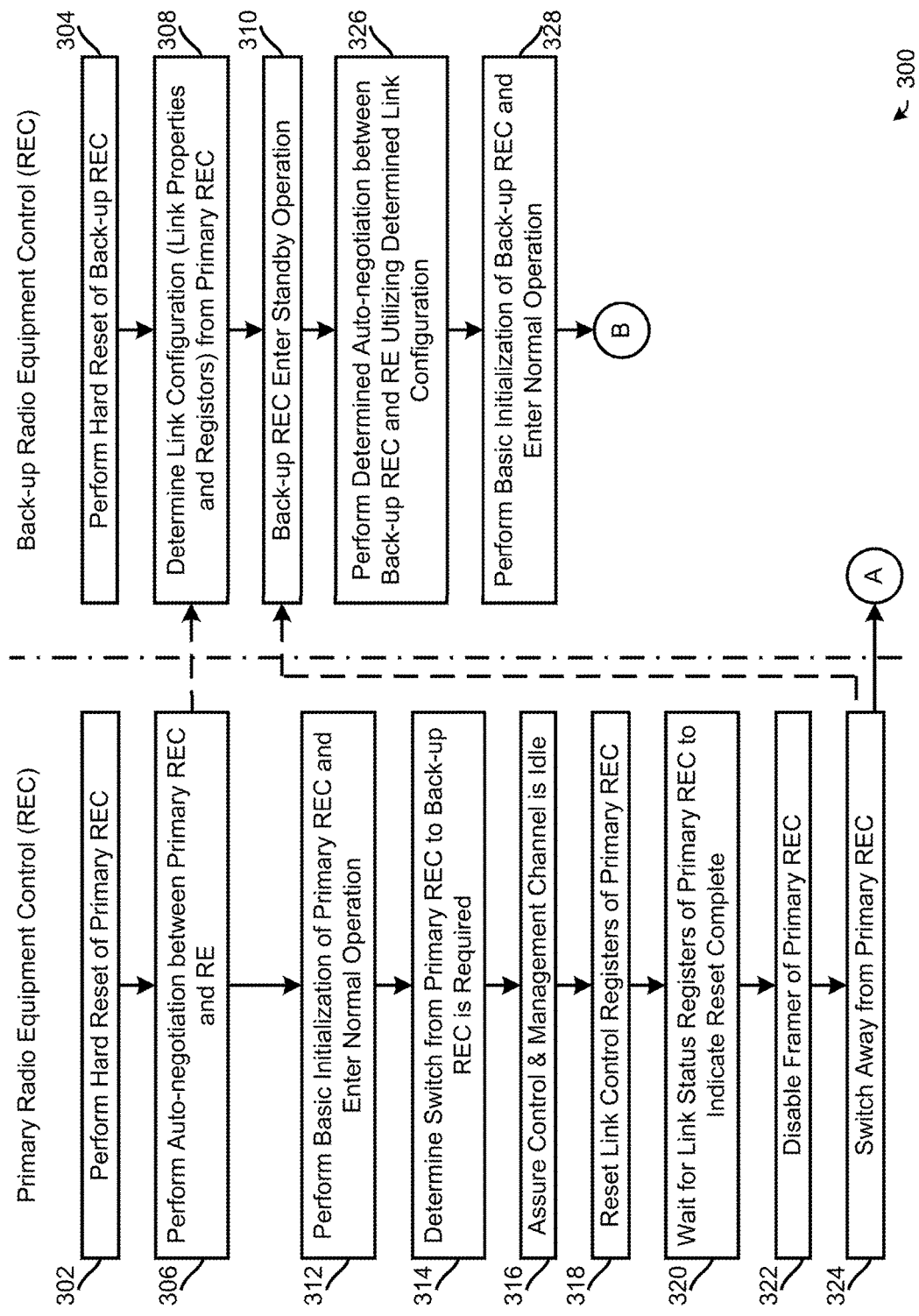
FIGS. 3 and 4 illustrates a method for performing hot switching and hot swapping of devices of the radio base station systems of FIGS. 1 and 2, in accordance with at least one embodiment of the present disclosure.
Figure 4:
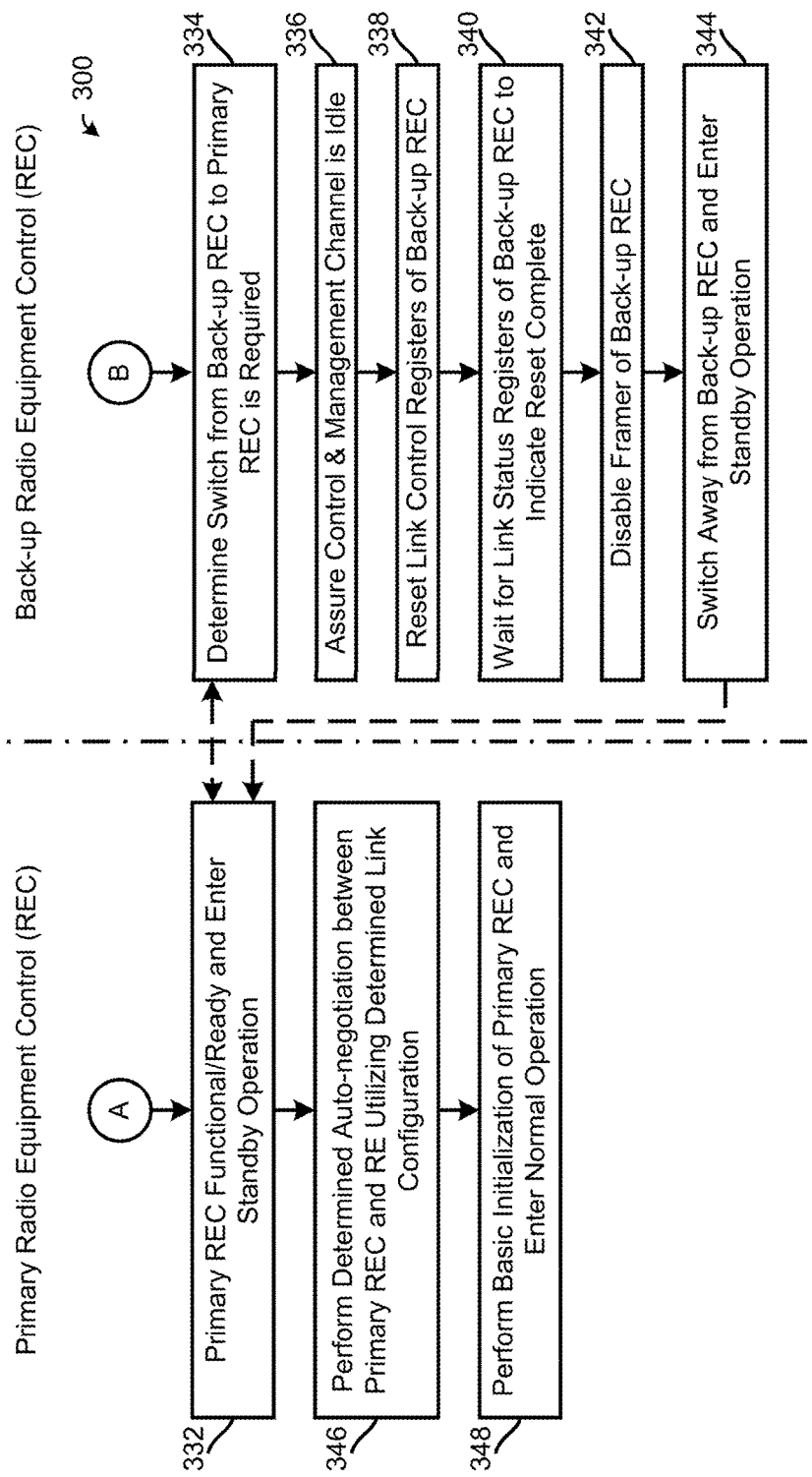

FIGS. 3 and 4, described in detail below, illustrate a method 300 for performing hot switching and hot swapping of primary and back-up RECs 102 and 104, links 172 and 174, and RE 106 of RBS 100 of FIG. 1.

The exemplary method 300 begins at block 302, where RBS 100 performs a hard reset of primary REC 102 and RE 106, which includes initializing link configurations tables 118 of primary REC 102 and 148 of RE 106. At block 304, back-up REC 104 performs a hard reset, which includes initializing the link configurations table of back-up REC 104. At block 306, the primary REC 102 performs an auto-negotiation between primary REC 102 and RE 106 to determine a link configuration of link 172 that is supported by both primary REC 102 and RE 106. At the start of the auto-negotiation, primary REC 102 may provide an indication to back-up REC 104 that the auto-negotiation between primary REC 106 and RE 106 has started, as indicated by the dashed arrow between blocks 306 and 308. In response to determining the link configuration of link 172, primary REC 102 stores (saves) the registers 116 at shadow registers 132 and may also provide the link configuration of link 172 to back-up REC 104. Method 300 then proceeds to block 312, unless the auto-negotiation fails, in which case method 300 ends.

At block 308, back-up REC 104 determines the link configuration of link 172 that is supported by both primary REC 102 and RE 106. In response to Back-up REC 104 receiving a signal that the auto-negotiation between primary REC 102 and RE 106 has started, back-up REC 104 may snoop the transactions of link 172 to determine the link configuration of link 172. In another embodiment, Back-up REC 104 may determine the link configuration of link 172 by receiving it from primary REC 102. In response to determining the link configuration of link 172, back-up REC 104 stores the link configuration of link 172 at shadow registers of back-up REC 104. At block 310, back-up REC 104 enters a standby operation. In response to back-up REC 104 receiving a signal that operation has been switched, as indicated by the dashed arrow between blocks 324 and 310, back-up REC 104 exits standby operation, and the method 300 proceeds to block 326, as described below. At block 312, primary REC 102 performs basic initialization of primary REC 102 and enters a normal operation.

At block 314, during normal operation primary REC 102 determines that a switch from primary REC 102 to back-up REC 104 is needed. At block 316, primary REC 102 assures that a control and management channel is idle. At block 318, primary REC 102 resets link 172 control registers of registers 116 and registers 146 including the transmit/receive antenna carrier control registers and the transmit/receive control registers, where primary REC 102 performs the reset of link 172 control registers of registers 116 and transmits a reset to RE 106 to cause RE 106 to perform the reset of link 172 control registers of registers 146. At block 320, primary REC 102 waits for link 172 transmit/receive status registers of primary REC 102 and RE 106 to indicate that the link 172 control registers of primary REC 102 and RE 106 have been reset, where primary REC 102 may poll transmit/receive status registers of primary REC 102 until transmit/receive status registers of primary REC 102 indicate that link 172 control registers of primary REC 102 have been reset, for example, transmit/receive status registers of primary REC 102 store a value of zero. Primary REC 102 may also receive an acknowledgement from RE 106 that indicates that the RE 106 link 172 control registers of RE 106 have been reset.

At block 322, the primary REC 102 disables framer 120. At block 324, primary REC 102 switches operation away from primary REC 102 to back-up REC 104 and may provide back-up REC 104 with an indication that operation is being switched to back-up REC 104, as indicated by the dashed arrow between blocks 324 and 310. Thus, the operation has been switched away from primary REC 102 to back-up REC 104 and hot switching from primary REC 102 and link 172 to back-up REC 104 and link 174 of RBS 100 has completed on primary REC 102. The method 300 then proceeds to block 332.

Method 300 proceeds from block 310 to block 326, as described above. At block 326, back-up REC 104 performs an auto-negotiation between back-up REC 104 and RE 106 utilizing the link configuration of link 172 that was supported by both primary REC 102 and RE 106 stored at the shadow registers of back-up REC 104, as described above. In response to the auto-negotiation being completed, the registers of back-up REC 104 include the values of the link configuration of link 174 from shadow registers 132, and back-up REC 104 and RE 106 are utilizing the same link configuration of link 174 that is supported by both back-up REC 104 and RE 106 and was previously determined by primary REC 102 and RE 106 during auto-negotiation described in detail above.

At block 328, back-up REC 104 performs basic initialization of back-up REC 104 and enters a normal operation. As such, the method 300 for performing hot switching from primary REC 102, link 172 and RE 106 to back-up REC 104, link 174, and RE 106 has successfully completed. Method 300 then proceeds to block 334, as described below.

Method 300 proceeded from block 324 to block 332, as described above. At block 332, primary REC 102 is in a functional and/or ready state and enters standby operation, and back-up REC 104 is in normal operation. In an embodiment, primary REC 102 may provide back-up REC 104 with an indication that primary REC 102 has entered standby operation and, in response, primary REC 102 receives the link configuration of link 174 from back-up REC 104, as indicated by the dashed arrows between blocks 332 and 334, and stores the link configuration of link 174 at shadow registers 132. In response to primary REC 102 receiving a signal that operation has switched to primary REC 102, as indicated by the dashed arrow between blocks 344 and 332, the method 300 proceeds to block 346, as described below.

Method 300 proceeded from block 328 to block 334, as described above. At block 334, during normal operation, back-up REC 102 determines that a switch from back-up REC 104 to primary REC 102 is needed. Back-up REC 104 may determine that the switch is needed based on receiving an indication that primary REC 102 has entered standby operation and, in response, back-up REC 104 provides the link configuration of link 174 to primary REC 102, as indicated by the dashed arrows between blocks 332 and 334. Back-up REC 104 may also determine that the switch is needed in the manner similar to block 314. At block 336, back-up REC 104 assures that a control and management channel is idle in the manner similar to block 316. At block 338, back-up REC 104 resets link 174 control registers of back-up REC 104 and RE 106, similar to the manner previously described of block 318.

At block 340, back up REC 104 waits for link 174 transmit/receive status registers of back-up REC 104 and RE 106 to indicate that the link 174 control registers of back-up REC 104 and RE 106 have been reset in a similar manner as described above of block 320. At block 342, the back-up REC 104 disables the framer of back-up REC 104. At block 344, back-up REC 104 switches operation away from back-up REC 104 to primary REC 102 and provides primary REC 102 an indication that operation is being switched to primary REC 102, as indicated by the dashed arrow between blocks 344 and 332, in a manner similar to block 324.

Method 300 proceeded from block 332 to block 346, as described above. At block 346, primary REC 102 performs the auto-negotiation between primary REC 102 and RE 106 utilizing the link configuration of link 172 stored at shadow registers 132. At block 348, primary REC 102 performs basic initialization of primary REC 102 and enters normal operation, completing the hot switching from back-up REC 104, link 174, and RE 106 to primary REC 102, link 172 and RE 106. As such, the completion of the hot switching from primary REC 102, link 172 and RE 106 to back-up REC 104, link 174, and RE 106 of method 300 and the completion of the hot switching from back-up REC 104, link 174, and RE 106 to primary REC 102, link 172, and RE 106 in a back-to-back manner completes the hot swapping of primary REC 102, link 172 and RE 106 and back-up REC 104, link 174, and RE 106.

Figure 5:
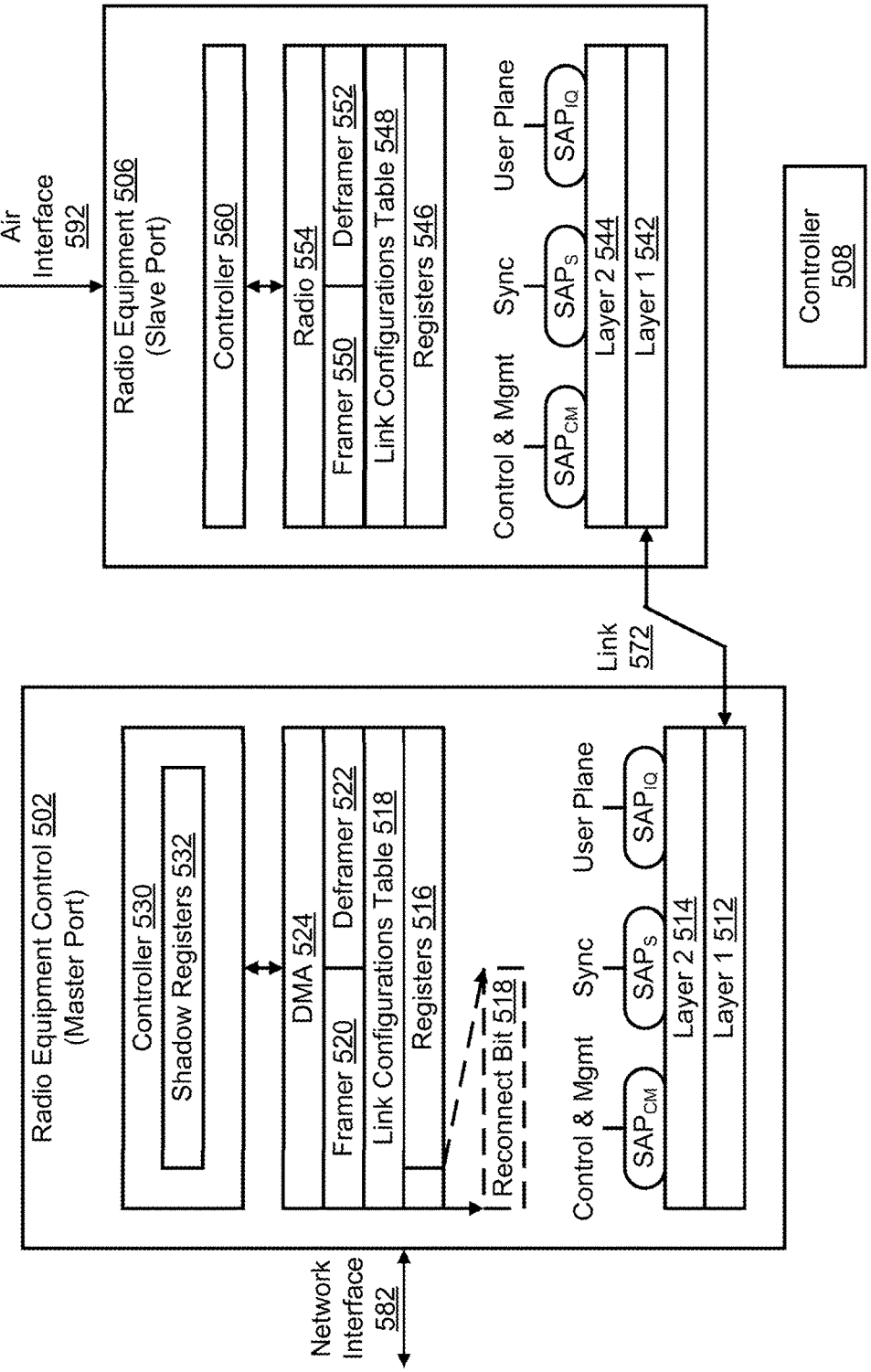
FIG. 5 is a block diagram illustrating a radio base station system that performs hot reconnection of devices of the radio base station system, in accordance with at least one embodiment of the present disclosure.

FIG. 5 illustrates a RBS 500 that has similar structure and functionality as RBS 100 and that performs hot reconnection of devices, including a REC 502, a RE 506, a link 572, a network interface 582, and an air interface 592. REC 502 communicates with RE 506 via link 572.

REC 502 has similar structure and functionality as primary REC 102 and includes a controller 530 having shadow registers 532, registers 516 having a reconnect bit 518, and a link configurations table 518. Link configurations table 518 includes link configurations information including all link configurations of link 572 that are supported by REC 502. Controller 530, registers 516, link configurations table 518, and other devices of REC 502 are connected to each other by an interconnect (not shown) and communicate with each other via the interconnect.

RBS 500 operates to perform hot reconnection of devices. As such, RBS 500 includes controller 508 having logic and control mechanisms that are configured to perform various operations in the performance of the hot reconnection, as described below. Controller 530 performs a hot reconnection of link 572 between REC 502 and RE 506 by performing a hard reset of REC 502 and RE 506 in a similar manner as previously described with reference to FIG. 1. Controller 530 performing the hard reset includes initializing link configurations table 518 with all the link configurations that are supported by REC 502. Similarly, controller 560 of RE 506 performs the hard reset, including initializing link configurations table 548 with all of the link configurations that are supported by RE 506.

Controller 530 performs an auto-negotiation between REC 502 and RE 506 to determine a link configuration of link 572 that is supported by both REC 502 and RE 506, utilizing link configurations tables 518 and 548 initialized during the hard reset, in a similar manner as the auto-negotiation between primary REC 102 and RE 106 described above with reference to FIG. 1.

Controller 530 performs basic initialization of REC 502 and enters normal operation. During normal operation of REC 502, controller 530 further detects that link synchronization of link 572 is lost (link is disconnected), for example, link 572 has been accidently disconnected from REC 502 and/or RE 506. Controller 530 may detect that synchronization of link 572 is lost by receiving an indication of the loss of link synchronization of link 572, a timer of controller 530 expires that indicates a communication between REC 502 and RE 506 has exceeded the time necessary to complete the communication and, as such, link 572 has disconnected, and the like. In an embodiment, link 572 is a CPRI link and controller 530 detects that synchronization of link 572 is lost when controller 530 does not receive the expected synchronization symbols when expected, as defined by the CPRI protocol.

In response to the detection that the link synchronization of link 572 is lost, controller 530 disables error interrupts of REC 502, stores (saves) registers 516, REC 502 configuration, at shadow registers 532, and disables framer 520 and DMA 524 of REC 502. REC 502 configuration at registers 516 includes transmit/receive antenna carrier control registers that indicates which antenna carriers are active, DMA transmit/receive control registers, transmit/receive sample width and number of antenna carriers registers, a mapping method register, and mapping information.

Controller 530 then waits for REC 502 system transactions to complete by waiting until transmit/receive status registers of registers 516 indicate that REC 502 system transactions have completed, for example, transmit/receive status registers of registers 516 store a value of zero.

In response to the REC 502 system transactions being complete, controller 530 enables framer 520, where framer 520 may be the CPRI framer, and waits for link re-synchronization of link 572. The re-synchronization of link 572 is detected by the controller 530 when it starts to receive minimal occurrences of expected synchronization symbols when expected, as defined by the CPRI protocol.

In an embodiment, in response to the re-synchronization of link 572 being complete, controller 530 may determine whether the link 572 is the same as the original link that controller 530 performed auto-negotiation between 502 and RE 506. In response to controller 530 determining that link 572 is not the same link as the original link, controller 530 communicates a re-connection error indicator to RBS 500 for further handling. Otherwise, controller 530 continues with the hot reconnection of link 572 between REC 502 and RE 506. Controller 530 may determine that link 572 was reconnected between REC 502 and RE 506 the same as during auto-negotiation utilizing a device identification included in a vendor specific space (VSS) control word received from RE 506 during link re-synchronization of link 572. The link 572 was reconnected between REC 502 and RE 506 the same as during auto-negotiation when the device identification received is the same device identification stored at shadow registers 532.

In response to the re-synchronization of link 572 being completed, controller 530 determines a data restart point for receiving user plane IQ data again utilizing a particular number of a radio frame and starts receiving the user plane IQ data when the particular number of the radio frame is received. The particular number of the radio frame can be a previously negotiated number, for example Y, which was determined while performing the auto-negotiation between REC 502 and RE 506 described above. In an embodiment, the link 572 is a CPRI link and the REC 502 waits until the value of the particular number of the radio frame is equal to Y−1, at which time, the REC 502 starts receiving the user plane IQ data at the Y number of the radio frame.

Controller 530 sets/asserts reconnect bit 518 of registers 516 that cause the error interrupts to be enabled by storing the error interrupts configuration from shadow registers 532 to the error interrupts configuration at registers 516 and the DMA to be enabled by configuring the DMA configuration at registers 516 utilizing the DMA configuration from shadow registers 532.

At this point, data transfers between REC 502 and RE 506 have been re-established and REC 502 has returned to normal operation. As such, controller 530 has successfully completed the hot reconnection of link 572 between REC 502 and RE 506.

By detecting a disconnection of a link between a REC and a RE and performing a hot reconnection of the link in the manner described above, the time to address the disconnection and perform the hot reconnection is minimized and unplanned and/or accidental disconnection of links is fully addressed. Thus, the radio base station system has rapid recovery time with minimal downtime and, as such, the quality of service of the baseband provider is improved. Performing the hot reconnection with the same physical link also reduces the amount of additional physical links needed and any configuration time of those additional links, further minimizing time, system cost, and system impact.

Figure 6:
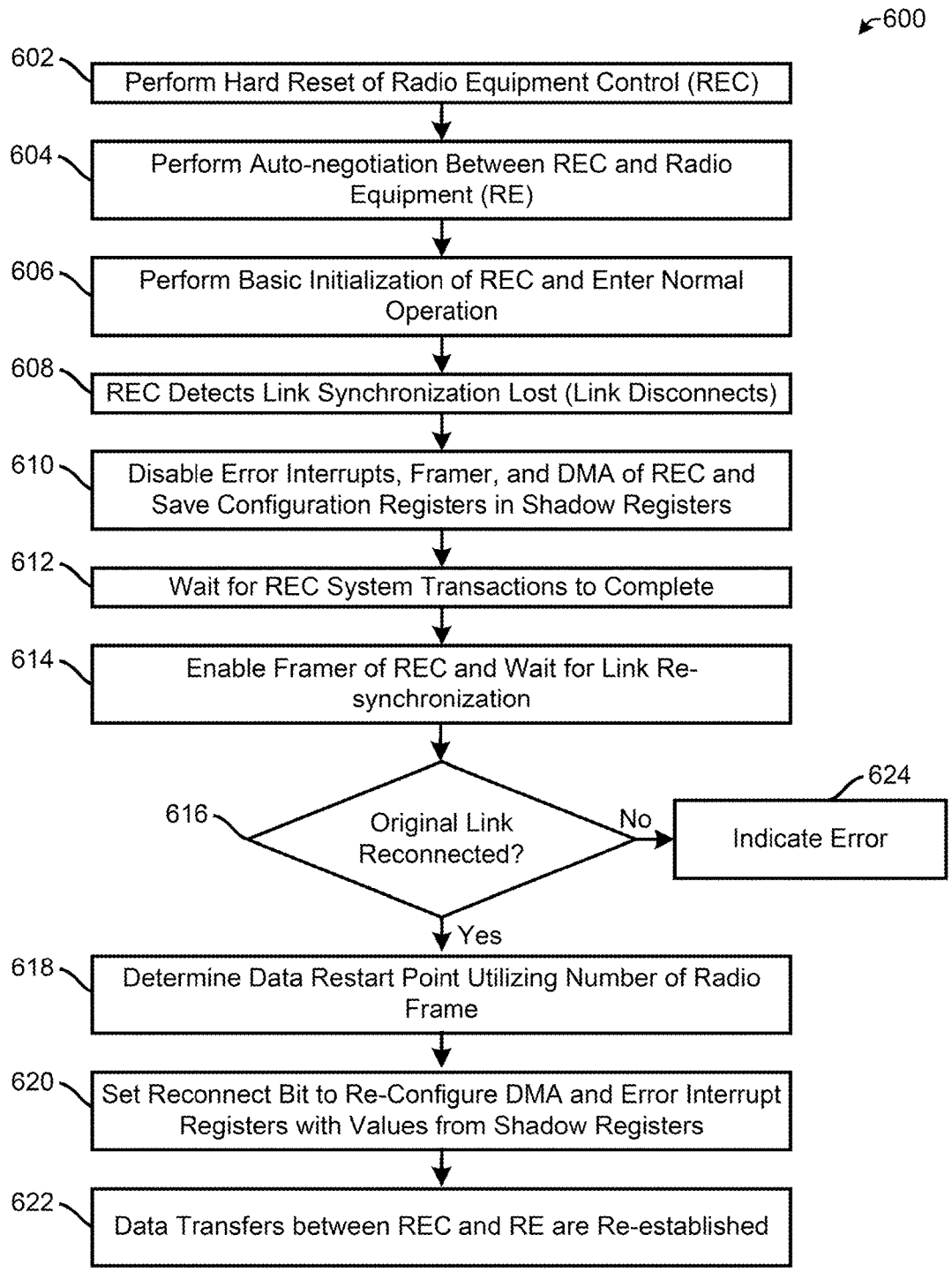
FIG. 6 illustrates a method for performing hot reconnection of devices of the radio base station system of FIG. 5, in accordance with at least one embodiment of the present disclosure.

FIG. 6 illustrates a method for performing hot reconnection of devices of the RBS 500 of FIG. 5, beginning at block 602, where RBS 500 performs a hard reset of REC 502 and RE 506. At block 604, controller 530 performs the auto-negotiation between REC 502 and RE 506 to determine a link configuration of link 572 that is supported by both REC 502 and RE 506, utilizing the link configurations tables 518 and 548. At block 606, controller 530 performs basic initialization of REC 502 and enters normal operation. At block 608, during normal operation controller 530 detects that link synchronization of link 572 is lost.

At block 610, controller 530 disables error interrupts of REC 502, stores (saves) registers 516, REC 502 configuration, at shadow registers 532, and disables framer 520 and DMA 524. At block 612, controller 530 waits for REC 502 system transactions to complete. At block 614, REC 502 enables framer 520 and waits for link re-synchronization of link 572.

At decision block 616, in an embodiment, method 600 proceeds directly to block 618. In another embodiment, controller 530 determines whether the link 572 was reconnected between REC 502 and RE 506 the same as during auto-negotiation as previously performed. If controller 530 determines that the link 572 was not reconnected the same, the method proceeds to block 624. If controller 530 determines that the link 572 was reconnected the same, the method proceeds to block 618. At block 624, in response to controller 530 determining that the link 572 was not reconnected the same, controller 530 communicates a re-connection error indicator to RBS 500 for further handling and method 600 ends. At block 618, controller 530 determines a data restart point for receiving user plane IQ data again utilizing a particular number of a radio frame and starts receiving the user plane IQ data when the particular number of the radio frame is received. At block 620, controller 530 sets/asserts reconnect bit 518 of registers 516 that cause the error interrupts to be enabled by storing the error interrupts configuration from shadow registers 532 to the error interrupts configuration at registers 516 and the DMA to be enabled by configuring the DMA configuration at registers 516 utilizing the DMA configuration from shadow registers 532. At block 622, data transfers between REC 502 and RE 506 have been re-established and REC 502 has returned to normal operation. As such, the method 600 for performing hot reconnection of link 572 between REC 502 and RE 506 has successfully completed.

It will be appreciated that the devices disclosed herein can be implemented in various manners using various types of memory.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

As used herein, the term "machine-executable code" can refer to instructions that can be provided to a processing device and can be executed by an execution unit. The machine-executable code can be provided from a system memory, and can include a system BIOS, firmware, or other programs. In addition, machine-executable code can refer to microcode instructions that can be used by a processing device to execute instructions, and can be provided by a microcode memory of the processing device.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method performed by a radio base station, the method comprising:
    establishing, by a first radio equipment control (REC) device, a first communication link between the first REC device and a radio equipment (RE) device, the first communication link being a main communication link between the first REC and the RE device;
    during the establishing of the first communication link, determining a link configuration of the first communication link;
    determining that a second communication link between a second REC device and the RE device is to be a new main communication link, instead of the first communication link, the second communication link being a backup communication link between the second REC device and the RE device; and
    establishing, by the second REC device, the second communication link based on the determined link configuration of the first communication link.

2. The method of claim 1, further comprising:
    receiving, by the second REC device, the determined link configuration of the first communication device provided by the first REC device.

3. The method of claim 1, wherein receiving the determined link configuration comprises:
    snooping, by the second REC device, communications of the first communication link to determine the determined link configuration of the first communication link.

4. The method of claim 1, further comprising:
    storing, by the first REC device, the determined link configuration of the first communication link to a storage location; and wherein
    establishing the second communication link includes reading the determined link configuration of the first communication link from the storage location.

5. The method of claim 1, wherein the first communication link and the second communication link are the same physical communication link.

6. The method of claim 1, wherein the first communication link and the second communication link are different physical communication links.

7. The method of claim 1, further comprising:
in response to establishing the second communication link, entering, by the first REC device, a stand-by operating mode.

8. The method of claim 1, wherein the first communication link and the second communication link comprising one or more internal base station interface types including a common public radio interface (CPRI) and an open base station architecture initiative (OBSAI) interface.

9. The method of claim 1, wherein determining that the second communication link is to replace the current communication link is in response to the first REC device being unavailable.

10. A radio base station system comprising:
a radio equipment (RE) device;
a first radio equipment control (REC) device to be coupled to the RE device by a first communication link, the first REC device configured to determine a link configuration of the first communication link, the first communication link to being a main communication link between the first REC device and the RE device; and
a second REC device;
wherein the radio base station is configured to determine that a second communication link between the second REC device and the RE device is to be a new main communication link, instead of the first communication link, the second communication link being a backup communication link between the second REC and the RE device; and
wherein the second REC device is configured to establish a second communication link based on the determined link configuration of the first communication link in response to it being determining that the second communication link between the second REC device and the RE device is to replace the current communication link.

11. The radio base station system of claim 10, the second REC device further configured to:
receive the determined link configuration of the first communication link provided by the first REC device.

12. The radio base station system of claim 10, the second REC device further coupled to the first REC device to snoop communications of the first communication link to determine the determined link configuration of the first communication link.

13. The radio base station system of claim 10, the first REC device further configured to:
store the determined link configuration of the first communication link to a storage location; and
the second REC device further configured to read the determined link configuration of the first communication link from the storage location.

14. The radio base station system of claim 10, wherein the first communication link and the second communication link are the same physical communication link.

15. The radio base station system of claim 10, wherein the first communication link and the second communication link are different physical communication links.

16. The radio base station system of claim 10, wherein, in response to the second communication link being established, the first REC device further configured to enter a stand-by operating mode.

17. The radio base station system of claim 10 further configured to determine that the second communication link is to replace the current communication link in response to the first REC device being unavailable.

18. The radio base station system of claim 10, wherein the first communication link and the second communication link are to be configured as one or more internal base station interface types including a common public radio interface (CPRI) and an open base station architecture initiative (OBSAI) interface.

* * * * *